US008160656B2

(12) United States Patent
Van Bosch et al.

(10) Patent No.: US 8,160,656 B2
(45) Date of Patent: Apr. 17, 2012

(54) TELEMATICS SYSTEM AND METHOD HAVING COMBINED CELLULAR AND SATELLITE FUNCTIONALITY

(75) Inventors: James A. Van Bosch, Crystal Lake, IL (US); Robert F. D'Avello, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 792 days.

(21) Appl. No.: 11/745,559

(22) Filed: May 8, 2007

(65) Prior Publication Data
US 2008/0278345 A1    Nov. 13, 2008

(51) Int. Cl.
H04M 1/00    (2006.01)
G08C 19/22    (2006.01)
(52) U.S. Cl. .................. 455/574; 455/575.9; 340/870.07
(58) Field of Classification Search .................. 455/574, 455/423, 575.9, 12.1, 11.1; 342/357.07; 340/870.07
See application file for complete search history.

(56) References Cited

U.S. PATENT DOCUMENTS

| 4,790,000 A | 12/1988 | Kinoshita |
| 4,989,230 A | 1/1991 | Gillig et al. |
| 5,127,042 A | 6/1992 | Gillig et al. |
| 5,260,988 A | 11/1993 | Schellinger et al. |
| 5,327,572 A | 7/1994 | Freeburg |
| 5,367,558 A | 11/1994 | Gillig et al. |
| 5,396,540 A | 3/1995 | Gooch |
| 5,406,643 A | 4/1995 | Burke et al. |
| 5,463,674 A | 10/1995 | Gillig et al. |
| 5,479,482 A | 12/1995 | Grimes |
| 5,669,061 A | 9/1997 | Schipper |
| 5,732,074 A | 3/1998 | Spaur et al. |
| 5,736,962 A | 4/1998 | Tendler |
| 5,777,580 A | 7/1998 | Janky et al. |
| 5,805,115 A | 9/1998 | Pellerin et al. |
| 5,826,188 A | 10/1998 | Tayloe et al. |
| 5,828,738 A | 10/1998 | Spaeth |
| 5,842,122 A | 11/1998 | Schellinger et al. |

(Continued)

FOREIGN PATENT DOCUMENTS

EP    0876073    11/1998

(Continued)

OTHER PUBLICATIONS

International Search Report for International Application PCT/US2008/062931, filed May 7, 2008.

Primary Examiner — Jinsong Hu
Assistant Examiner — Opiribo Georgewill

(57) ABSTRACT

A vehicle Telematics unit includes a cellular transceiver and a satellite receiver. At least one controller controls the transceiver and the receiver and determines which one to use to communicate with a source of Telematics service. If the transceiver is to be used, the controller receives messages in cellular communications from the source with a cellular network. If the receiver is to be used, the controller receives messages in satellite communications from the source with a satellite network. The controller can programmably control power from a battery to the transceiver and receiver when the vehicle is turned off using discontinuous reception parameters, designated on/off times, a controlled duration, and programmable timers. The transceiver is used to return acknowledgments of messages received. If a message is received with the receiver, the acknowledgment is stored so it can be sent at another time when the transceiver is to be used.

24 Claims, 7 Drawing Sheets

U.S. PATENT DOCUMENTS

| | | |
|---|---|---|
| 5,914,675 A | 6/1999 | Tognazzini |
| 6,111,539 A | 8/2000 | Mannings et al. |
| 6,122,514 A | 9/2000 | Spaur et al. |
| 6,141,560 A | 10/2000 | Gillig et al. |
| 6,169,515 B1 | 1/2001 | Mannings et al. |
| 6,198,930 B1 | 3/2001 | Schipper |
| 6,341,255 B1 | 1/2002 | Lapidot |
| 6,356,822 B1 | 3/2002 | Diaz et al. |
| 6,427,101 B1 | 7/2002 | Diaz et al. |
| 6,429,768 B1 | 8/2002 | Flick |
| 6,430,486 B1 | 8/2002 | Diaz et al. |
| 6,484,096 B2 | 11/2002 | Wong et al. |
| 6,516,192 B1 | 2/2003 | Spaur et al. |
| 6,539,296 B2 | 3/2003 | Diaz et al. |
| 6,608,832 B2 | 8/2003 | Forslow |
| 6,609,103 B1 | 8/2003 | Kolls |
| 6,680,923 B1 | 1/2004 | Leon |
| 6,751,452 B1 | 6/2004 | Kupcayk et al. |
| 6,785,551 B1 | 8/2004 | Richard |
| 6,813,493 B2 | 11/2004 | Criqui et al. |
| 6,839,614 B1 | 1/2005 | Timko et al. |
| 6,853,853 B1 | 2/2005 | Van Wiemeersch et al. |
| 6,868,313 B2 | 3/2005 | Koljonen |
| 6,871,067 B2 * | 3/2005 | Clark et al. .................... 455/428 |
| 6,889,042 B2 | 5/2005 | Rousseau et al. |
| 6,970,703 B2 | 11/2005 | Fuchs et al. |
| 6,975,928 B2 | 12/2005 | Timko et al. |
| 7,171,226 B2 | 1/2007 | Crocker et al. |
| 2002/0065037 A1* | 5/2002 | Messina et al. .............. 455/12.1 |
| 2002/0197988 A1* | 12/2002 | Hellaker ....................... 455/423 |
| 2003/0190030 A1* | 10/2003 | Alton ............................. 379/219 |
| 2004/0012501 A1* | 1/2004 | Mazzara et al. ......... 340/870.11 |
| 2004/0127206 A1 | 7/2004 | Van Bosch et al. |
| 2004/0127265 A1* | 7/2004 | Van Bosch et al. ........... 455/574 |
| 2005/0203673 A1* | 9/2005 | El-Hajj et al. ..................... 701/1 |
| 2006/0135170 A1 | 6/2006 | Patenaude |
| 2007/0093943 A1 | 4/2007 | Nelson et al. |

FOREIGN PATENT DOCUMENTS

| | | |
|---|---|---|
| WO | WO 9526094 | 9/1995 |
| WO | WO 9815143 | 4/1998 |
| WO | WO 9829975 | 7/1998 |
| WO | WO 9929126 | 6/1999 |
| WO | WO 9948315 | 9/1999 |
| WO | WO 0190853 | 11/2001 |

* cited by examiner

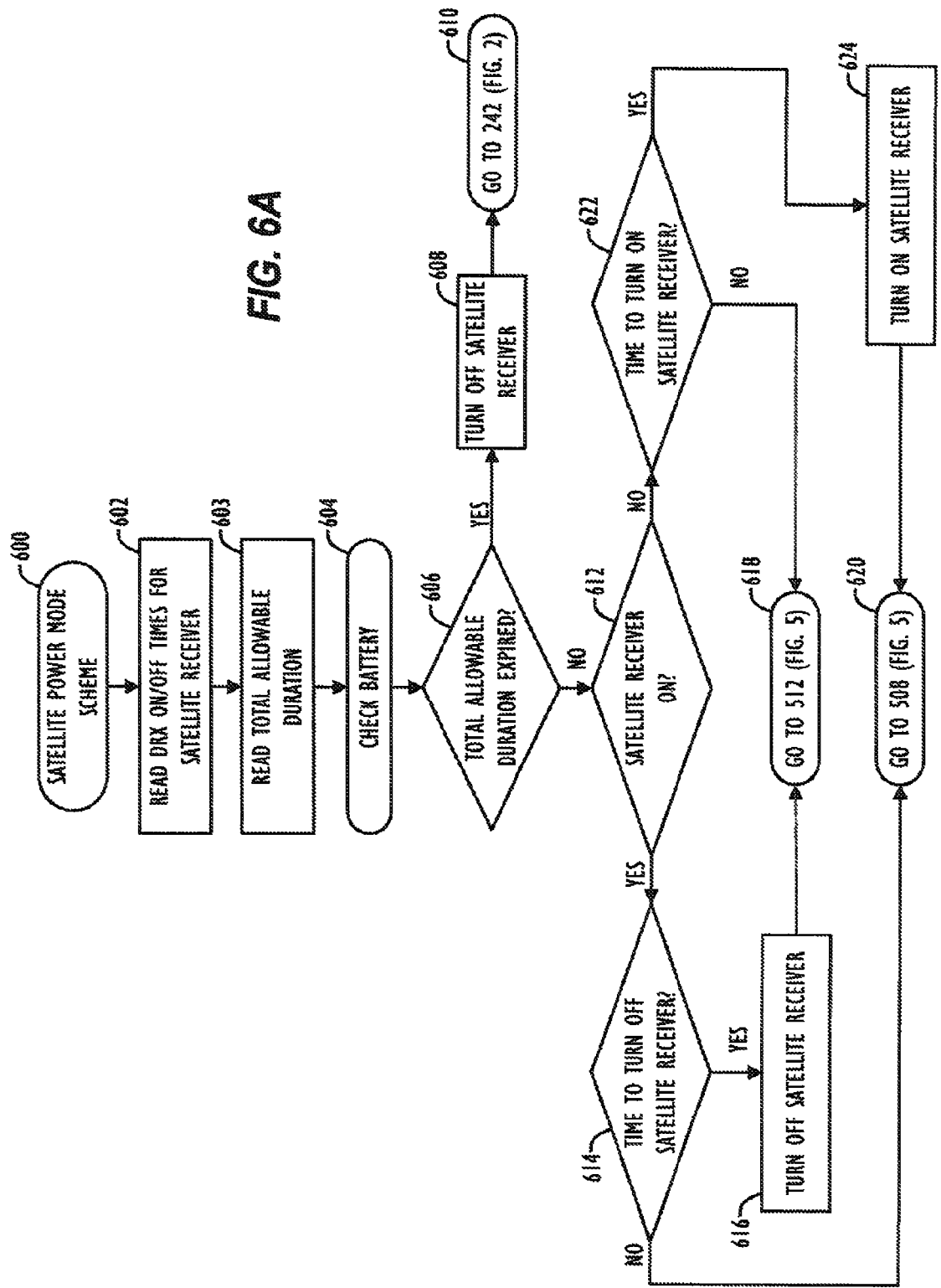

TELEMATICS SYSTEM AND METHOD HAVING COMBINED CELLULAR AND SATELLITE FUNCTIONALITY

FIELD OF THE DISCLOSURE

The subject matter of the present disclosure generally relates to a system and method for providing Telematics services for a vehicle using both cellular and satellite functionalities.

BACKGROUND OF THE DISCLOSURE

Telematics systems are known in the art that offer Telematics services for vehicles. Typically, the vehicle has a Telematics unit wife an integrated cellular transceiver. In the U.S., the cellular transceiver may be a CDMA/AMPS transceiver, while a GSM transceiver may be used in Europe. Telematics systems can also use other cellular standards (e.g., WCDMA). The Telematics systems can provide wireless communication and can provide remote Telematics services, such as unlocking the doors of the vehicle, flashing the headlights of the vehicle, or performing other automated actions. These types of remote Telematics services can be especially useful for a person who has accidentally locked her keys in her car or who is stranded in some remote location.

Existing Telematics units in the vehicle may drain power from the battery while the vehicle's ignition is off. In addition, because existing Telematics system rely on cellular network coverage to operate, the Telematics system may be unable to perform Telematics services when a Telematics units in a vehicle travels to an area where cellular coverage is limited or not existent. When the vehicle is out of cellular coverage, a driver in a remote area without cellular must use a landline phone or some other means to contact a Telematics service provider to request service.

The subject matter of the present disclosure is directed to overcoming, or at least reducing the effects of, one or more of the problems set forth above.

BRIEF DESCRIPTION OF THE DRAWINGS

Preferred embodiments and other aspects of subject matter of the present disclosure will be best understood with reference to a detailed description of specific embodiments, which follows, when read in conjunction with the accompanying drawings, in which:

FIGS. 6A through 6C illustrate power mode schemes for operating a satellite receiver of the Telematics unit.

Figure 1:
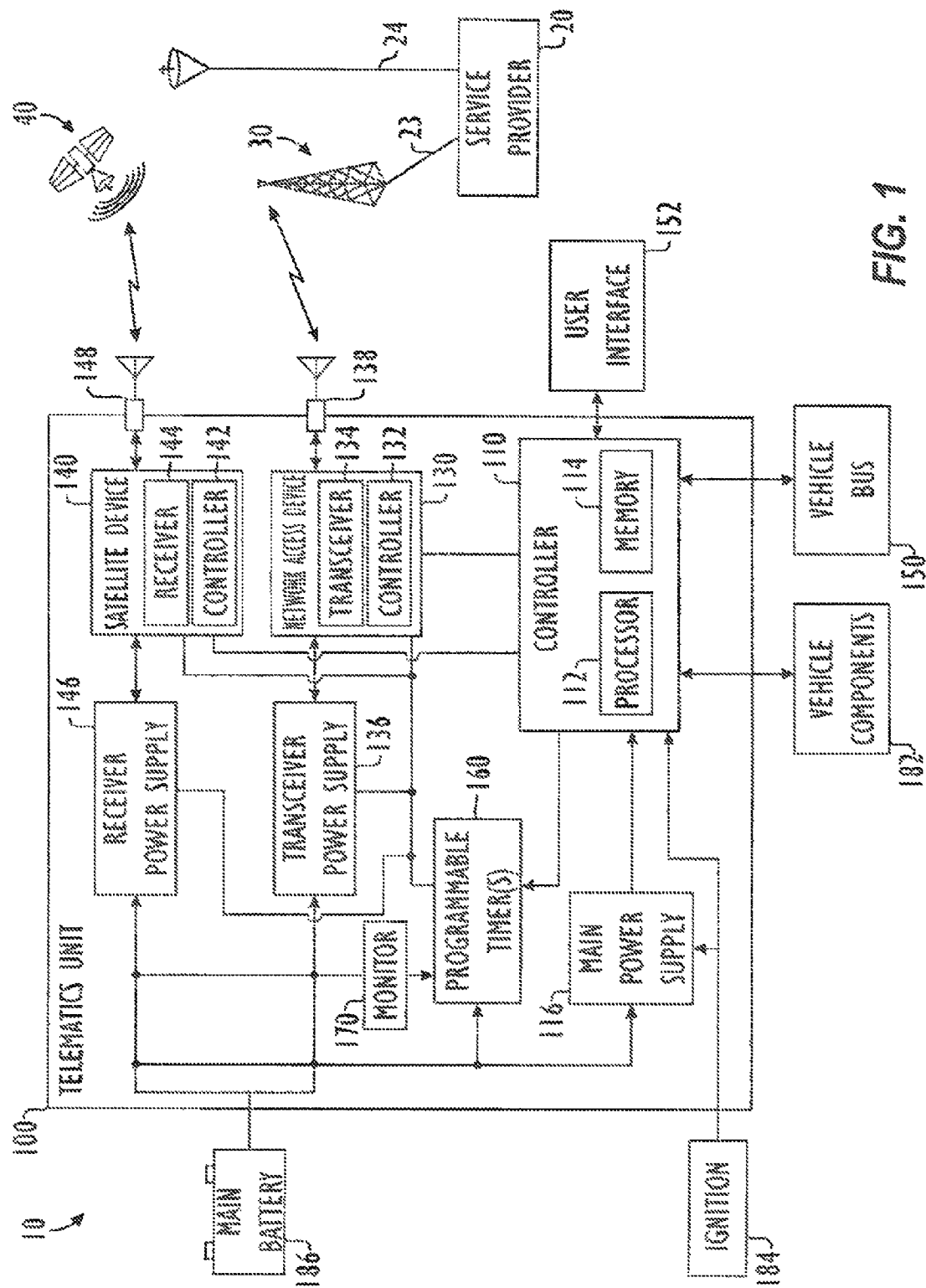
FIG. 1 schematically illustrates an embodiment of a Telematics system having a service provider and a Telematics unit according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

A Telematics system and method are disclosed. In one embodiment, a vehicle Telematics unit of a Telematics system includes a cellular transceiver, a satellite receiver, and at least one controller. The cellular transceiver is used for communicating cellular communications with a source of Telematics service via a cellular network. The satellite receiver is used for receiving satellite communications from the source via a satellite network. The at least one controller is communicatively coupled to the cellular transceiver and the satellite receiver and establishes communication with the source using either one or both of the cellular transceiver and the satellite receiver.

During operation, the controller determines whether to use the cellular transceiver or the satellite receiver to communicate with the source. To determine whether to use the cellular transceiver or the satellite receiver, the controller determines whether the cellular transceiver is capable of communicating with the cellular network, whether the cellular transceiver is out of communication range of the cellular network, whether the cellular network is congested, whether an expense for using the cellular network exceeds a predetermined amount, and/or whether using the cellular network is not preferred.

If the controller determines that the cellular transceiver is to be used, the controller operates in a cellular mode to receive messages in cellular communications communicated from the source to the cellular transceiver. The messages can include one or more instructions (e.g., unlocking the vehicle's doors), and the controller can instruct one or more vehicle components to implement the instructions in the messages. While in the cellular mode, the controller can also return acknowledgments of received messages by communicating the acknowledgment in cellular communications from the cellular transceiver to the source. If the controller determines that the satellite receiver is to be used, the controller operates in a satellite mode to receive messages in satellite communications communicated from the source to the satellite receiver. In the satellite mode, the controller can store any acknowledgments of the received messages and can return the stored acknowledgments in cellular communications communicated from the cellular transceiver to the source when the cellular transceiver is to be used.

In addition to determining whether to use the cellular or satellite functionalities, the controller can control the power consumption of a battery coupled to the Telematics unit. For example, the controller can determine if the vehicle's ignition is turned off. Then, when the ignition is off, the controller can programmably control power from the battery to fee cellular transceiver and the satellite receiver. To programmably control power to the cellular transceiver, for example, the controller can receive a discontinuous reception parameter from the cellular network with the cellular transceiver and can control the supply of battery power to the cellular transceiver based on the discontinuous reception parameter. To programmably control power to the satellite receiver, for example, the controller can obtain on and off times designated for operating the satellite receiver and can control the supply of battery power to the cellular transceiver based on those designated on and off times. As part of the programmable control, the controller can program a plurality of timers to track on and off states in which the satellite receiver is operated and can compare those timers to the on and off times designated for operating the satellite receiver. Alternatively, the controller can obtain a total allowable duration designated for powering the satellite receiver while the ignition is off. Then, the controller can allow the battery power to be supplied to the satellite receiver for only the total allowable duration.

The foregoing is not intended to summarize each potential embodiment or every aspect of the present disclosure. Let us now refer to the figures to describe the subject matter of the present disclosure in detail.

Referring to FIG. 1, an embodiment of a Telematics system 10 according to certain teachings of the present disclosure is schematically illustrated. The Telematics system 10 includes a Telematics service provider 29 and a Telematics unit 100, which in the present embodiment are vehicle-based. Although described as vehicle-based in the present disclosure, one skilled in the art will appreciate that the teachings of the present disclosure are not limited to such vehicle-based Telematics systems but may also apply to other implementations where both cellular and satellite Telematics services are desirable.

The Telematics service provider 20, as its name indicates, provides Telematics services for the vehicle. To provide theses services, the Telematics service provider 20 has a communication link 23 with a wireless or cellular network 30 and has another communication link 24 with a satellite network 40. Details related to the communication links 23 and 24 between the Telematics service provider 20 and the networks 30 and 40 will be evident to those skilled in the art and are not described in detail herein. Briefly, however, the cellular network 30 can include any of a number of standard cellular communication networks, public switched telecommunication network (PSTN), the Internet, and integrated services digital networks (ISDN). The satellite network 40 can use one or more communication satellites.

Using the networks 30 and 40, fee Telematics service provider 20 provides Telematics applications and services to the Telematics unit 100. For example, the service, provider 20 may have operators, servers, and databases. The servers for the Telematics applications and services can include traffic servers, map servers, user profile servers, location information servers, and the like. The databases for the Telematics applications and services can have location information, user profiles, traffic content, map content, point-of-interest content, usage history, and the like.

The Telematics unit 100 includes a controller 110, a network access device 130, and a satellite device 140. In the present embodiment, the controller 110, network access device 130, and satellite device 140 are shown as somewhat independent. For example, the controller 110 has a processor 112 and memory 114, the network access device 130 has its own controller 132 and a cellular transceiver 134, and the satellite device 140 has its own controller 142 and a satellite receiver 144. Although the Telematics unit 100 is schematically shown as an integrated unit, it will be appreciated that the controller 110 can be an independent component external from the network access device 130 and satellite device 140, which can be independent of one another. In addition, the network access device 130 and satellite device 140 may not have their own controller 132 and 134. Instead, the controller 110 can be a unitary controller for the unit 100 and one or both of the cellular transceiver 132 and satellite receiver 142, for example.

The Telematics unit 100 is communicatively coupled to a bus 150 of the vehicle (not shown) in which the unit 100 is installed and can have a user interface 152. The Telematics unit 100 is also communicatively coupled to vehicle components 182, an ignition 184, and a power supply or main battery 186. The vehicle components 182 can include door locks, lights, entertainment system, navigation system, communication system, and various automated or electronic devices found in a vehicle. The vehicle bus 150 can be a data bus of the vehicle, an On-Board Diagnostic (OBD) connection, or the like. The power supply 186 includes a vehicle battery that is used to power the Telematics unit 100, especially when the vehicle's ignition 184 is off.

The network access device 130 is used for transmitting uplink communications to and receiving downlink communications from the service provider 20 over cellular or wireless communication links. In this way, the Telematics system 10 can use existing cellular or wireless communications links to provide traditional Telematics services (e.g., unlocking vehicle doors, etc.) to the Telematics unit 100. The network access device 130 can be based on Advanced Mobile Phone Service (AMPS), Global System for Mobile Communications (GSM), Time Division Multiple Access (TDMA), Code Division Multiple Access (CDMA), (WCDMA), or other protocols. To transmit data in the cellular environment, different types of standard bearer services exist including, but not limited to, general packet radio service (GPRS), short message service (SMS), circuit switched data service (CSD), and high-speed circuit switched data service (HSCSD). In another embodiment, standard transmission control protocol/ internet protocol (TCP/IP) may also be used.

In one embodiment, the Telematics unit 100 preferably uses the cellular functionality of the network access device 130 as its main link to receive and send cellular communications with the service provider 20, and the satellite device 140 is used as a secondary or redundant communication channel to receive downlink communications from the service provider 20 sent to the vehicle from the satellite network 40. Preferably, the satellite functionality is used if the network access device 130 is not capable of communicating with the cellular network 30 and/or is not preferred. For example, the Telematics unit 100 in the vehicle may be out of range of any cellular coverage of the cellular network 30, the network access device 130 may fail to establish a link for whatever reason, or cellular communications may be congested or expensive. Instead of using the cellular functionality, the Telematics system 10 can use satellite communication links to provide traditional Telematics services (e.g., unlocking vehicle doors, etc.) to the vehicle in these types of situations.

During operation, for example, the network access device 130 is powered and is used to receive any of the communications from the service provider 20 via the cellular network 30 and its wireless antenna 138. At certain points or intervals, however, the controller 110 preferably determines if the network access device 130 is capable of communicating with the cellular network 30 (e.g., whether the vehicle is out of range of cellular coverage, the network access device 130 is not functioning) and/or whether using the cellular network 30 is preferred (e.g., the network 30 is congested, use of the network 30 would be expensive from this location, etc.). If the network access device 130 is capable of communicating with the cellular network 30 and/or it is preferred, the controller 110 waits for messages in cellular or wireless communications from the service provider 20. The messages can include instructions or commands to be implemented by vehicle components 182.

When a message is received, the controller 110 processes the received messages and instructs the corresponding vehicle components 182 to implement the instructions of the received message. After execution, the controller 110 configures an acknowledgment that the message has been received and/or that the instructions in the messages have or have not been successfully performed. The controller 110 can also access any stored acknowledgments from previous messages that have yet to be transmitted. Finally, the controller 110 accesses the cellular transceiver 130 and returns the one or more acknowledgments to the service provider 20 via the cellular network 30. Of course, before returning the acknowledgments, the controller 110 may again determine if the cellular transceiver 130 is still capable of communicating with the cellular network 30 and/or if it is preferred. If not, the controller 110 can instead store the configured acknowledgements for sending later.

If the network access device 130 is determined to be incapable of communicating with the cellular network 30 or is not preferred for whatever reason, however, the Telematics unit 100 instead uses the satellite functionality. For example, the cellular service provided by the cellular network 30 at a given point during operation may be overly congested, restrictive, or expensive. Alternatively, the network access device 130 may simply be out of range of the cellular network 30. In such a situation, the controller 110 powers up the satellite device 140, if not already powered, and waits for a message in a satellite communication communicated from the service provider 20 via the satellite network 40. For its part, the service provider 20 may initially attempt to send a message in a cellular communication to the Telematics unit 100 via the cellular network 30. When an acknowledgment to that cellular communication has not been received from the Telematics unit 100 in a certain time period because the Telematics unit 100 is actually out of cellular coverage, for example, then the service provider 20 then sends the message in a satellite communication to the Telematics unit 100 via the satellite network 40.

When the satellite device 140 receives the message in the satellite communication, the controller 110 processes the received message and instructs the vehicle components 182 to implement the instructions in the message. Finally, the controller 110 configures an acknowledgment of the message and/or its successful implementation and stores the acknowledgment so it can be returned later to the service provider 20 with the network access device 130. When the vehicle returns to an area with cellular coverage, for example, the stored acknowledgement can be sent back to the Telematics service provider 20 for positive confirmation. The acknowledgments of the messages received in the satellite communications are returned later using the network access device 130 because the Telematics unit 100 in the present embodiment has satellite receiver 144 as opposed to having a satellite transceiver capable of sending and receiving satellite communications. However, in an alternative embodiment, the Telematics unit 100 can include a satellite transmitter in addition to the satellite receiver 144 so the Telematics unit 100 can return the acknowledgments in satellite communications via satellite communications.

The Telematics unit 100 in the vehicle can be operated when the vehicle is running or not running (i.e., when the ignition 184 is on or off). When the vehicle ignition 184 is "on" the Telematics unit 100 can operate with either one or both of the cellular and satellite functionalities without significant concerns about power consumption. Consequently, the network access device 130 may be continuously powered while the vehicle is "on," and the satellite device 140 can also be continuously powered or can be freely powered up when needed.

When the vehicle ignition 184 is "off," however, the Telematics unit 100 preferably operates efficiently by addressing issues of power consumption caused by both monitoring and operating the combined cellular and satellite functionalities. In the present embodiment, the Telematics unit 100 includes a main power supply 116, one or more programmable timers 160, a monitor 170, a transceiver power supply 136, and a receiver power supply 146, each of which are used to address the power consumption by the Telematics unit 100. The various power supplies 116, 136, and 146 of the unit 100 are electrically connected to the main battery 186 of the vehicle and are used respectively to control the supply of power and to convert the voltage from the battery 186 to voltages for the controller 110, network access device 130, and satellite device 140.

The controller 110 provides the programmable timers 160 with information on when the power to the transceiver 134 and receiver 144 should be enabled and disabled. In turn, the power supplies 136 and 146 receive inputs from the programmable timers 160 and control the supply of battery power to the transceiver 134 and receiver 144, respectively. The programmable timers 160 can include circuitry separate from the controller 110. Alternatively, the programmable timers 160 can be part of or otherwise integrated into the controller 110.

If the vehicle is on, then the network access device 130 and satellite device 140 can both be powered and operated at the same time because the devices 130 and 140 can both be supplied with sufficient power. However, when the vehicle ignition 184 is turned off, it may be necessary for the Telematics unit 100 to monitor and control the power consumption. A brief explanation of how the Telematics unit 100 monitors and controls power consumption is discussed here and additional details will be explained later.

Initially, the controller 110 receives a signal that the vehicle's ignition 184 has been turned off. The controller 110 can operate the network access device 130 and the satellite device 140 in powered states in at least two modes: a continuous power mode and a periodic power mode. In the continuous power mode, for example, the circuitry for at least the receiving portions of the cellular transceiver 134 or the satellite receiver 144 can be continuously supplied with power from the battery 186 through the power supply 136 or supply 146, respectively. In a periodic power mode, the circuitry for at least the receiving portions of the cellular transceiver 134 or the satellite receiver 144 can be periodically supplied with power from battery 186 through the power supply 136 or supply 146, respectively.

For the periodic power mode, the controller 110 can determine on/off duty cycles for the power supplies 136 and 146. In one embodiment, the controller 110 determines the on/off duty cycles for the network access device 130 based on a discontinuous reception (DRX) parameter received from the cellular network 30. The on/off duty cycles for the transceiver power supply 136 are sent to the programmable timers 160, and the programmable timers 160 then use the duty cycles to disable and enable the transceiver power supply 136. In one embodiment, the controller 110 determines on/off duty cycles for the programmable timers 160 used to disable/enable the power supply 146 to the satellite device 140. The on/off duty cycles for the receiver power supply 146 can be based on preset on/off times stored in memory 114 and know to the service provider 20.

As noted above, the on/off duty cycles for the programmable timers 160 used to disable/enable the power supply 136 to the network access device 130 can be based on a discontinuous reception (DRX) parameter received from the cellular network 30. Discontinuous reception allows the Telematics unit 100 to power down significant amounts of its internal circuitry for a high percentage of time when the unit 100 is idle. Discontinuous reception also allows the Telematics unit 100 to know when page requests from the service provider 20 directed to the unit 100 may be transmitted via the cellular network 30. For example, the Telematics unit 100 can "sleep" during times that it knows that its paging requests will not be transmitted. When the Telematics unit 100 enters a particular paging area, the cellular transceiver 134 obtains a parameter from the cellular network 30 as part of the registration process. The parameter is then used by the controller 110 and other applications to control power to the cellular transceiver 134 while the vehicle ignition 184 is off.

The parameter from the cellular network 30 tells the network access device 130 how often to "wake up" and to process a page in the area of cellular coverage. In GSM networks, for example, a discontinuous reception factor (or "DRX factor") can be used to notify the unit 100 of the paging repetition rate within a particular area. The DRX factor is broadcast in the Broadcast Control Channel (BCCH). A low value for the DRX factor indicates that the unit 100 should check for paging messages with a greater frequency, while a high value for the DRX factor indicates that the network access device 30 should check for the paging messages with a lower frequency. In general, checking with greater frequency reduces the delay in setting up an incoming message but has the downside of draining the battery 186 quicker. By contrast, checking with lower frequency reduces the draining of the battery 186 but has the downside of further delaying the setup of an incoming message.

In addition to controlling the power supplies 136 and 146 with the programmable timers 160 and duty cycles, the Telematics unit 100 can use power saving techniques such as disclosed in U.S. Patent Publications 2004/0127265 to Von Bosch et al. and 2004/0127206 to Van Bocsh et al., which are both incorporated herein by reference. For example, the network access device 130 and satellite device 140 can monitor the voltage level of the battery 186 and can control the power supplies 136 and 146 if a low battery voltage is detected. In another example, the monitor 170 can be used to monitor the current levels, which the programmable timers 160 can then use to control the power supplies 136 and 146 if an excessive accumulated drawn current is detected.

Figure 2:
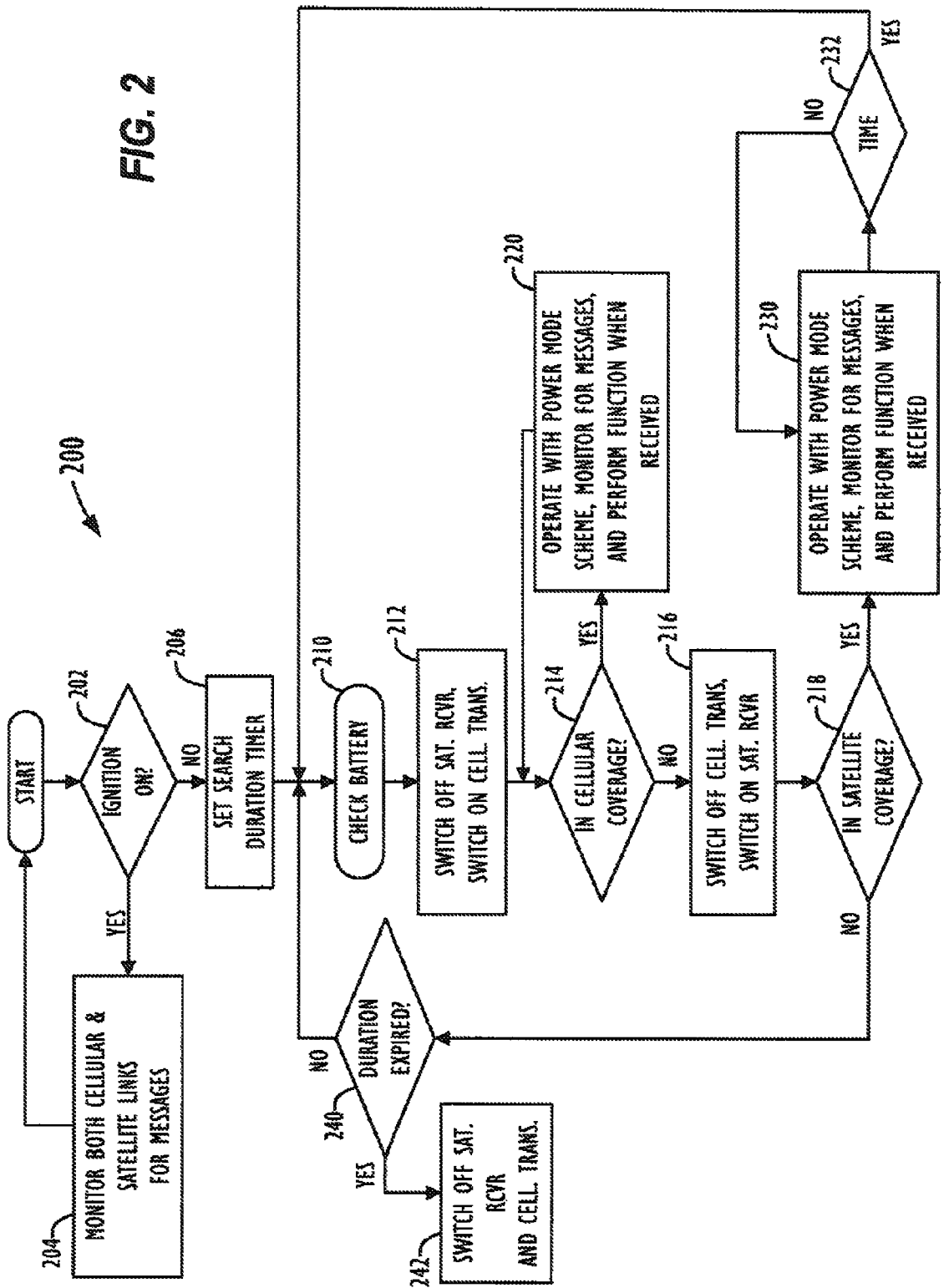
FIG. 2 illustrate a process of operating the Telematics system.

Now that details of the Telematics system 10 have been discussed, we now turn to a discussion of how the Telematics system 10 operates. Referring to FIG. 2, a process 200 of operating the Telematics system, is illustrated in flowchart form. In the discussion that follows, reference is concurrently made to element numerals for components of FIG. 1.

Initially, the controller 110 of the Telematics unit 100 determines if the vehicle's ignition 184 is "on" (Block 202). If so, the Telematics unit 100 preferably functions in a normal mode (Block 204). In this normal mode, both the network access device 130 and the satellite device 140 can remain operational at the same time and can be used to monitor for communications from the Telematics service provider 20 via she cellular network 30 and/or the satellite network 40. The functions implicated in a received message can be performed, and acknowledgments can be resumed via the cellular network 30.

When the vehicle's ignition 184 is determined to be "off" at Block 202, the Telematics system 10 preferably functions in a power save mode and sets a search duration timer (Block 206). The search duration timer is a preset length of time in which the Telematics unit 100 will attempt to establish a connection with either of the networks 30 and 40. If connection cannot be established with either network 30 and 40 within the time limit of the duration timer, the Telematics unit 100 preferably powers down both the network access device 130 and satellite device 140 to conserve the vehicle's battery 186.

After setting the search duration timer, the Telematics unit 100 can determine whether the battery 186 has a low voltage level, which can be caused by any of a number of reasons (Block 206). Checking the battery level and shutting off the devices 130 and 140 can be performed at my point in the operation of the Telematics unit 100 but has been shown here as part of the initial steps.

Figure 3:
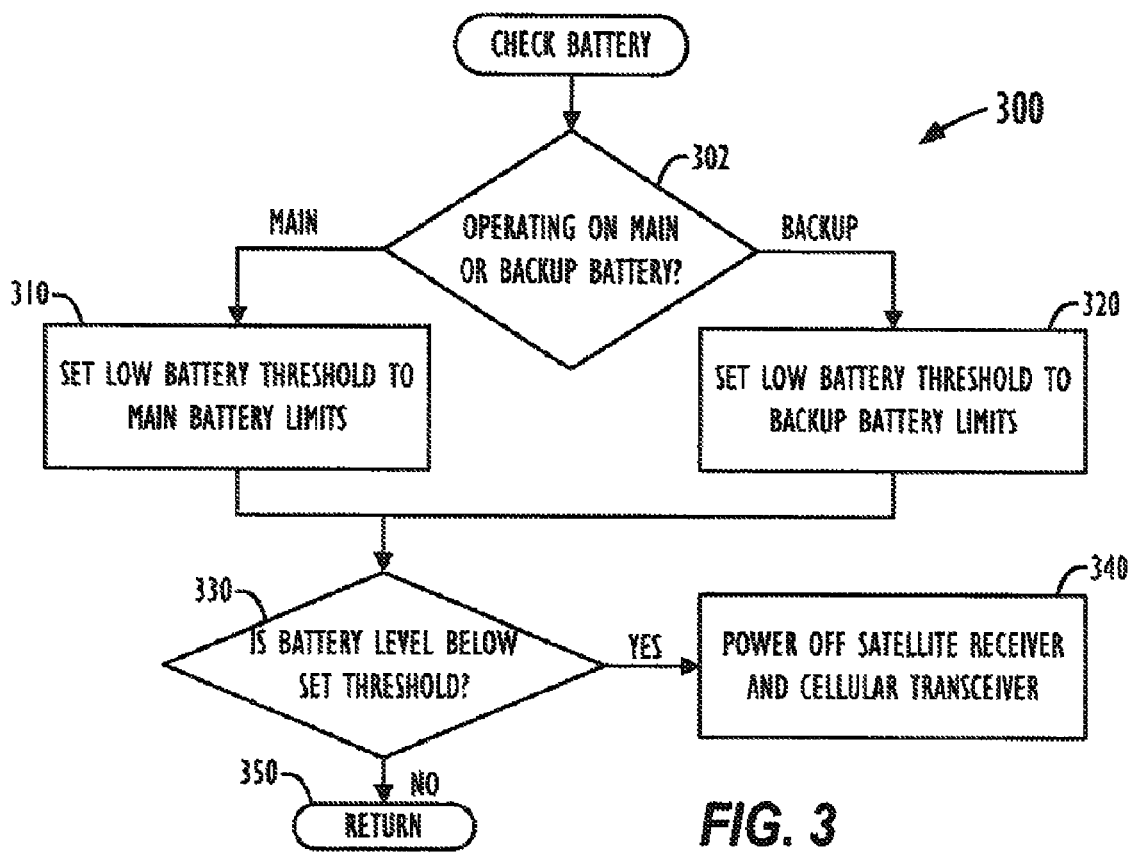
FIG. 3 illustrates a process of checking a battery coupled to the Telematics unit.

Discussion briefly turns to a process of checking the battery 186 coupled to the Telematics unit 110 illustrated in FIG. 3. In the battery checking process 300, the controller 110 first determines whether it is operating on a main or backup battery in the vehicle (Block 302). If operating from the main battery, the controller 110 sets a low battery threshold to the limits of the main battery (Block 310). If operating from the backup battery, the controller 110 sets the low battery threshold to the limits of the backup battery (Block 328). In either case, the controller 110 determines from the current monitor 170 of the unit 100 whether the battery level is below the set threshold (Block 330). If so, the controller 110 preferably switches the network access device 130 and the satellite receiver 140 to a power-off state to preserve power in this circumstance. Otherwise, the controller 110 returns to its current operation (Block 350).

We now return to FIG. 2 to continue our discussion of how the Telematics unit 100 operates to conserver battery power. After determining that the battery 186 is not low at Block 210, the Telematics unit 100 powers up the network access device 130 (if not already on) and turns off the satellite device 140 (if not already off) (Block 212). When powered up, the network access device 130 determines whether the cellular transceiver 134 is capable of communicating with the cellular network 30 (e.g., whether the transceiver 134 is within cellular coverage of the network 30) (Block 214).

If so, then the Telematics unit 100 operates the network access device 130 according to a power mode scheme, monitors for messages in cellular communications, and performs functions in received messages (Block 220). The messages communicated to the vehicle are preferably encrypted using known encryption techniques known in the art. The messages can be specific to a vehicle or can be sent to "group" of vehicles.

For the power mode scheme, the cellular transceiver 134 can be turned on continuously only for a programmable amount of time, or it can be turned on and off periodically according to on/off duty cycles. In one embodiment discussed previously, the Telematics unit 100 can uses DRX techniques disclosed herein and disclosed in the incorporated U.S. patent Publications 2004/0127265 and 2004/0127206 to control when to turn the cellular transceiver 134 on and off. When turned on, the cellular transceiver 134 monitors for messages in cellular communications, implements any functions or instructions contained in those messages, and returns acknowledgments according to the techniques disclosed herein. One embodiment of a process of operating the network access device 130 with a power mode scheme is discussed below with reference to FIG. 4. At any point while operating the network access device 130, the Telematics unit 100 can determine whether the cellular transceiver 134 is still capable of communicating with the cellular network 30 by returning to Block 214.

If the cellular transceiver 134 is initially or subsequently incapable of communicating with the cellular network 30 for whatever reason while the vehicle's ignition 184 is still off, the Telematics unit 100 powers down the network access device 130 and instead powers up the satellite device 140 (Block 216). If the satellite device 140 includes its own controller 142 as in the embodiment of FIG. 1, then the satellite device 140 determines whether the satellite receiver 144 is capable of communicating with a satellite network 40. Otherwise, the main controller 110 of the Telematics unit 100 can perform this function.

Satellite coverage may be blocked or unavailable for any number of reasons. If the satellite receiver 144 is incapable of receiving communications from the satellite network 40, then the Telematics unit 100 determines whether the search duration timer—initially set at Block 206—has expired (Block 240). If so, then the Telematics unit 100 powers down both the network access device 130 and the satellite device 140 indefinitely to conserver battery power (Block 242). For example, the vehicle having the Telematics unit 100 may be parked for an extended period of time in a basement garage where neither cellular or satellite coverage is available. Therefore, it is desirable in such a situation to stop attempting to establish communications with the cellular and satellite networks 30 and 40 while the vehicle ignition 184 remains off. If, on the other hand, the search duration timer has not expired at Block 240, the process 200 can return to previous steps such as checking the battery to determine if it has a low voltage (Block 210).

If the satellite receiver 144 is capable of receiving satellite communications at Block 218, then the satellite device 140 is operated with a power mode scheme so it can establish communications with the satellite network 40, receive messages in satellite communications, yet still conserver battery power. An embodiment of a process of operating the satellite device 140 is discussed below with reference to FIG. 5. To conserver battery power, the Telematics unit 100 can use a number of techniques for the power mode scheme while operating the satellite receiver 144. In one power mode scheme discussed below with reference to FIG. 6C, the satellite receiver 144 can be turned on continuously only for a programmable amount of time (e.g., one hour). In other power mode schemes discussed below with reference to FIGS. 6A-6B, the satellite receiver 144 can be programmed to wakeup periodically and then go to sleep for programmable amounts of time to conserve the vehicle's battery 186. When powered up, the satellite receiver 144 awaits incoming messages.

To reduce the current drain on the battery 186, the satellite receiver 144 can be turned on at preset or know times so that the service provider 20 can know when the Telematics unit 100 in the vehicle with the ignition 184 off will be most likely to receive a satellite communication. For example, the Telematics unit 100 can decode the time from a GPS receiver (not shown) that is coupled to the unit 100. Using the decoded time, the Telematics unit 100 can power up the satellite receiver 144 at precise time intervals according to preset times stored in memory. This time interval could be programmable (short or long delays). The time interval when the satellite receiver 144 is on would be known by design by the service provider 20. Thus, the service provider 20 would know when the Telematics unit 100 in the vehicle would be on and would be capable of receiving a message from the service provider 20 (e.g., unlock the doors or flash the lights) via the satellite network 40. When a message in a satellite communication is received, the Telematics unit 100 implements the functions in the message and configures an acknowledgement indicating whether the function has been successfully implemented or not.

Preferably, the Telematics unit 100 operates the satellite receiver 144 (either continuously or intermittently) for only a predetermined amount of time. Accordingly, the Telematics unit 100 checks whether the predetermined amount of time has expired (Block 232). If not, then the process can return to operating the satellite device 140. Otherwise, the process 200 returns to Block 210 to eventually determine if the battery 186 is low and to determine whether cellular converge is available or improved.

Figure 4:
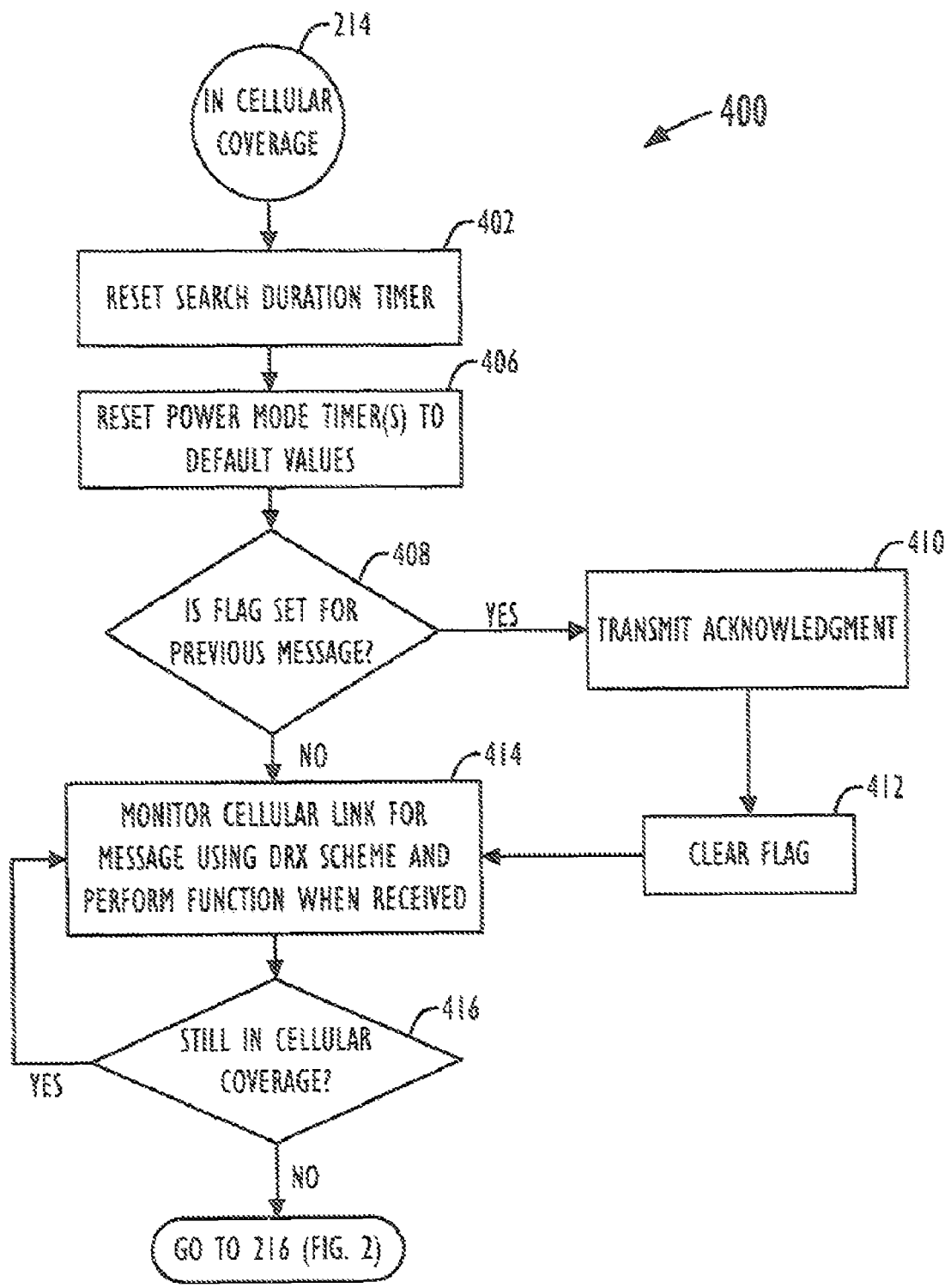
FIG. 4 illustrates a process of operating the network access device of the Telematics unit to conserver power.

As noted previously at Block 220 of FIG. 2, the network access device 130 is preferably operated with a power mode scheme to conserve battery power when the vehicle's ignition 184 is "off." Turning to FIG. 4, a process 400 of operating the network access device 140 to conserver battery power is illustrated in flow chart form. After determining that the network access device 130 is in cellular coverage (Block 214), the controller 110 resets the search duration timer that was initially set at Block 206 of FIG. 2 (Block 402). Additionally, the controller 110 resets power mode timer(s) to default values (Block 406). These power mode timers are part of the one or more programmable timers 160 of the Telematics unit 100 discussed previously. The power mode timers are ultimately used to conserve battery power by limiting the amount of time the transceiver 134 and receiver 144 can search for signals, can remain idle awaiting messages, or can remain powered up from the time that the ignition 184 was turned off. The power mode timers may be programmable and may change during operation of the Telematics unit 100 as circumstances, such as cellular and satellite coverage, changes. Therefore, the default values would represent the preset or predetermined values initially stored within the unit 100.

Next, the controller 110 determines whether a flag has been previously set for any acknowledgments of previous messages that could not be sent via the cellular network 30. If the flag exists, the controller 110 instructs the network access device 140 to transmit the stored acknowledgments to the service provider 20 (Block 410), and the controller 110 clears the flag (Block 412).

If no flag was set or if the flag is cleared, the Telematics unit 100 then monitors the cellular link for messages using the DRX techniques and schemes disclosed herein, and the Telematics unit 100 performs the functions contained in any of the received messages (Block 414). After operating according to the DRX techniques in Block 414 for a predetermined amount of time, the network access device 130 determines if it is still in cellular coverage (Block 416). If so, the unit 100 can continue monitoring for messages in cellular communications. Otherwise, the process returns to Block 216 of FIG. 2 so the cellular transceiver 134 can be turned off and the satellite receiver 144 can be turned on.

Figure 5:
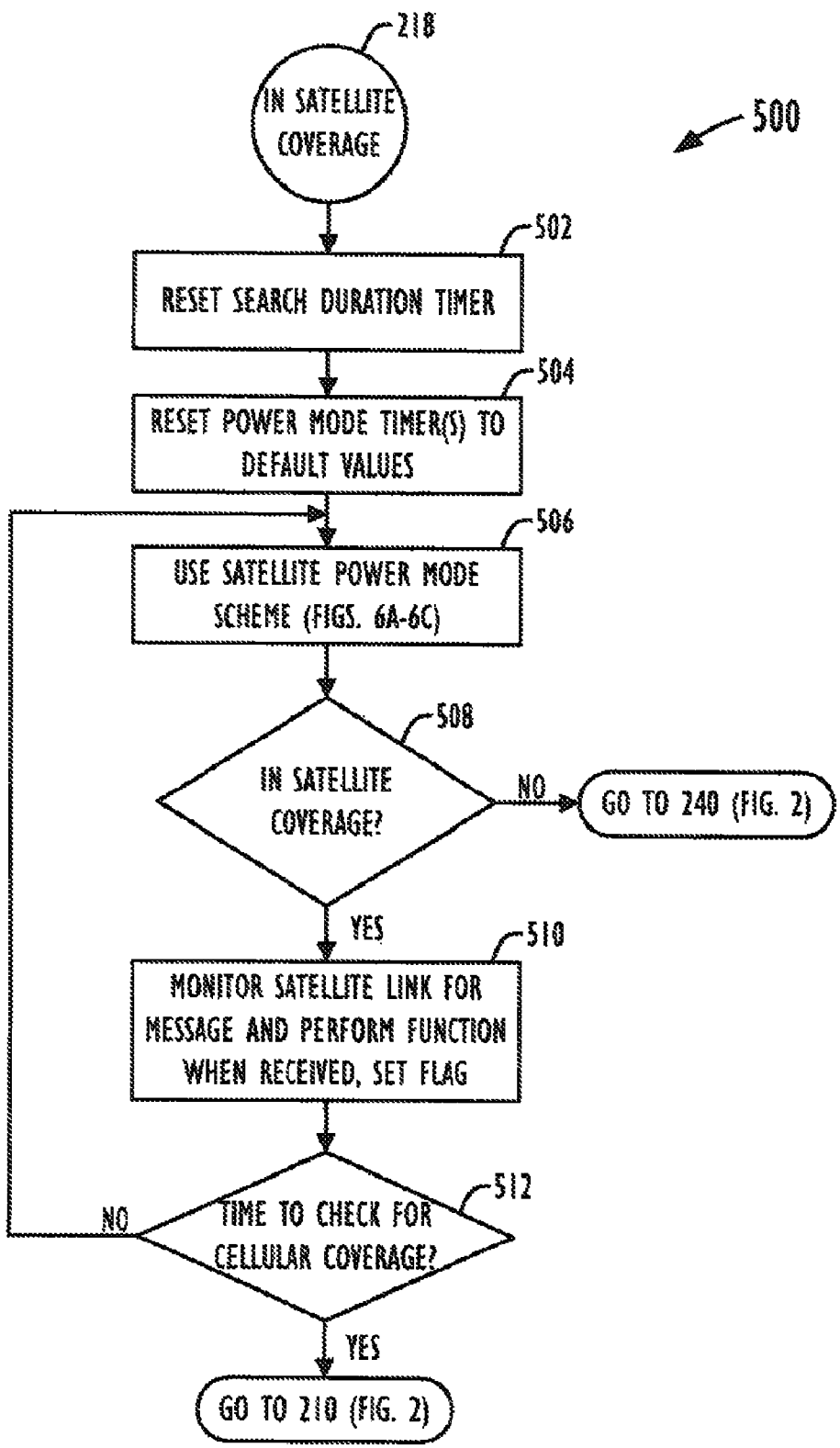
FIG. 5 illustrates a process of operating the satellite receiver of the Telematics unit to conserver power.

As noted previously at Block 230 of FIG. 2, the satellite device 130 is also preferably operated with a power mode scheme to conserve battery power when the vehicle's ignition 184 is "off." Turning to FIG. 5, a process 500 of operating the satellite device 140 to conserver battery power is illustrated in flow chart form. After determining that the satellite device 140 is in satellite coverage (Block 218), the controller 110 resets the search duration timer that was initially set at Block 206 of FIG. 2 (Block 502). Additionally, the controller 110 resets the power mode timer(s) to default values as discussed previously (Block 504).

Then, the Telematics unit 100 uses a satellite power mode scheme to control the satellite device 140 and to conserve battery power. Embodiments of power mode schemes for the satellite device 140 are discussed below with reference to FIGS. 6A through 6C. In general, these power mode schemes limit the total duration of time that the satellite receiver 144 is allowed to remain on and continue searching for satellite communications or satellite coverage. In addition, these power mode schemes control when and for how long the satellite receiver 144 may be turned on and off.

After initiating the power mode scheme, the satellite device 140 determines whether it is still in satellite coverage (Block 508). If not, the process 500 returns to block 240 of FIG. 2 to determine if the total search duration has expired. If the device 140 is in satellite coverage, however, the satellite receiver 144 monitors the satellite link for messages from the service provider 20 and performs the functions contained in those messages when received (Block 510). In addition, any acknowledgments for received messages are preferably stored in memory and a flag is set so the stored acknowledgment can be sent later by the unit 100 when cellular communication is possible.

After a predetermined amount of time of monitoring the satellite link, the Telematics unit 100 determines whether if is time to cheek for cellular coverage (Block 512). If a cellular link cannot be established, the process 500 returns to Block 506 to use the satellite power mode scheme to conserving the battery power. If a cellular link can be established, then the process 500 returns to Block 206 of FIG. 2 to check the power level of the vehicle's battery 186 and subsequently to check for cellular coverage.

In FIG. 6A, a first power mode scheme 600 for operating the satellite receiver 144 is illustrated in flow chart form. As noted above, the power mode scheme 600 is initiated at Block 506 of FIG. 5. This first power mode scheme 600 uses programmed DRX on/off times to control when to turn on and off the satellite receiver 144. Initially, the DRX on/off times for the satellite receiver 144 are read from programmable memory (Block 602), and the total allowable duration of operating the satellite receiver 144 is read from programmable memory (Block 603). If the satellite device 140 is capable of implementing DRX under its own control (e.g., the satellite device 140 has controller 142 capable of DRX), then the controller 142 can read the on/off times from a programmable memory (not shown) of the satellite device 140. On the other hand, if the satellite device 140 receives DRX control externally (e.g., the main controller 110 gives external control), then the processor 112 of the controller 110 reads the on/off times from its programmable memory 114. The on/off times are used to control when the satellite receiver 144 is turned on and off to monitor for messages in satellite communications from the service provider 20.

After reading the above information, the Telematics unit 100 checks the battery according to the techniques disclosed above (Block 604) and determines whether the total allowable duration for operating the satellite receiver 144 has expired (Block 606). If the duration has expired, the satellite receiver 144 is powered off (if not already) (Block 608) and operation essentially returns to Block 242 of FIG. 2 where both the satellite receiver 144 and the cellular transceiver 134 are turned off because the total allowed time to search for coverage has expired (Block 610).

If the total allowable duration for operating the satellite receiver 144 has not expired at Block 606, however, the controller 110/142 determines if the satellite receiver 144 is on (Block 612). If it is on, the controller 110/142 determines from the stored on/off times if it is time to turn off the satellite receiver 144 (Block 614). If so, the receiver 144 is turned off (Block 616), and operation returns to Block 512 of FIG. 5 to determine whether it is time to check if the cellular transceiver 134 is in cellular coverage (Block 618). If it is not yet time to turn off the receiver 144, operation returns to Block 508 of FIG. 5 to continue monitoring for messages (Block 620).

Similarly, if the satellite receiver 144 is not on at Block 612, the controller 110/142 determines if it is time to turn on the satellite receiver 144 based on the on/off times read from memory (Block 622). If it is time to turn on, the receiver 144 is turned on (Block 624), and operation returns to Block 508 of FIG. 5 to monitor for messages (Block 620). If the receiver 144 is not on and it is not yet time to turn it on at Block 622, then operation returns to Block 512 of FIG. 5 to determine whether it is time to check if the cellular transceiver 134 is in cellular coverage (Block 618).

Figure 6B:
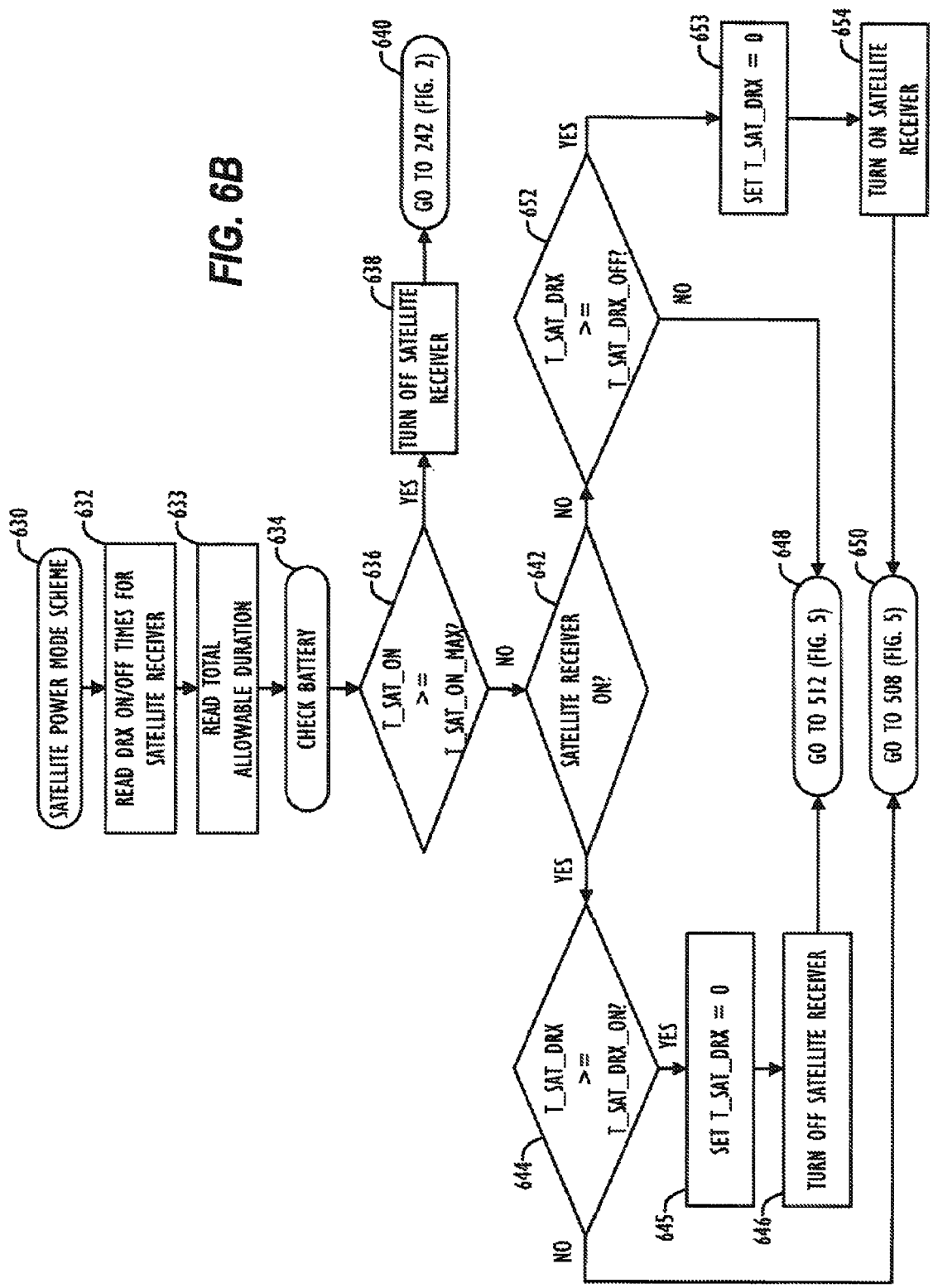

In FIG. 6B, a second power mode scheme 630 for operating the satellite receiver 144 is illustrated in flow chart form. Again, this power mode scheme 630 is initiated at Block 506 of FIG. 5 and uses programmed DRX on/off times to control when to turn on and off the satellite receiver 144. Initially, the on/off times for the satellite receiver 144 and the total allowable duration of operating the satellite receiver 144 are read from programmable memory in either the satellite device 140 or controller's programmable memory 114 (Blocks 632 & 633). After reading the on/off time, the Telematics unit 100 checks the battery according to the techniques disclosed above (Block 634).

Next, the Telematics unit 100 controls supply of power from the battery 186 to the satellite receiver 144 based on the designated DRX on/off times read from memory. These designated on/off times may be preconfigured or preset times, for example, and the Telematics unit 100 can determine current time from a GPS receiver, internal clock, or other device to determine when current time corresponds to one of the designated on/off times. Using the on/off times, a plurality of timers 160 can be programmed to track the on/off states in which the satellite receiver 144 is operated in comparison to the on/off times designated for operating the satellite receiver 144. These timers 160 can include (T_SAT_ON) that indicates a current amount of time that the satellite receiver 144 has been on; (T_SAT_ON_MAX) that indicates a maximum amount of time that the satellite receiver 144 is permitted to be on since the ignition 184 has been turned off; (T_SAT_DRX) that indicates a current amount of time that the satellite receiver 144 has been on in a current on/off or DRX time period; (T_SAT_DRX_ON) that indicates an amount of time that the satellite receiver 144 is to be on in each on period; and (T_SAT_DRX_OFF) that indicates an amount of time that the satellite receiver 144 is to be off in each off period.

Using these timers 160 during operation, the Telematics unit 100 determines whether the current amount of time that the satellite receiver 144 has been on (T_SAT_ON) meets or exceeds the maximum amount of time that she satellite receiver 144 is permitted to be on (T_SAT_ON_MAX) (Block 636). If the receiver 144 has been on for as long as is allowed, the satellite receiver 144 is powered off (if not already) (Block 638), and operation essentially returns to block 242 of FIG. 2 so that no more battery power will be consumed by the Telematics unit 100 while the vehicle's ignition 184 remains off (Block 640).

If the time that the satellite receiver 144 has been on is less than the maximum time limit at Block 636, the controller 110/142 determines if the satellite receiver 144 is on (Block 642). If it is on, the controller 110/142 determines if the current amount of DRX time that the satellite receiver 144 has been on in the current DRX period (T_SAT_DRX) meets or exceeds the amount of time that the satellite receiver is to be on in each DRX period (T_SAT_DRX_ON) (Block 644). If so, the current amount of DRX time that the satellite receiver 144 has been on (T_SAT_DRX) is set to 0 (Block 645), the DRX receiver 144 is turned off (Block 646), and operation returns to Block 512 of FIG. 5 to determine whether it is time to check if the cellular transceiver 134 is in cellular coverage (Block 648). If the receiver 144 is on but it is not yet time to turn it off, then operation returns to Block 508 of FIG. 5 so that the receiver 144 can continue to monitor for messages (Block 650).

Similarly if the receiver 144 is not on at Block 642, the controller 110/142 determines if the current amount of DRX time that the satellite receiver 144 has been off in this current DRX period (T_SAT_DRX) meets or exceeds the amount of time that the satellite receiver 144 is set to be off in each DRX period (T_SAT_DRX_OFF) (Block 652). If it is time then to turn on the receiver 144, the current amount of DRX time that the satellite receiver 144 has been off (T_SAT_DRX) is set to 0 (Block 653), the receiver 144 is turned on (Block 654), and operation returns to Block 508 of FIG. 5 so the receiver 144 can monitor for messages (Block 650). If the receiver 144 is not on and it is not yet time in the DRX period to turn it on at Block 652, operation instead returns to Block 512 of FIG. 5 to determine whether it is time to check if the cellular transceiver 144 is in cellular coverage (Block 648).

In FIG. 6C, a third power mode scheme 660 for operating the satellite receiver 144 is illustrated in flow chart form. This power mode scheme 660 is used when the satellite receiver 144 is to be powered continuously for a programmable duration and is not periodically turned on and off. In this scheme 660, the total allowable time duration for the satellite receiver 144 to be on is read from programmable memory (Block 662). The battery level is then checked using the techniques disclosed herein (Block 664), and a determination is made whether the total allowable time duration has expired (Block 666). If so, the satellite receiver 144 is powered off (Block 669). Otherwise, the scheme returns to Block 508 of FIG. 5 so the receiver 144 can continue monitoring for messages (Block 670).

As alluded to above, a number of programmable timers 160 in FIG. 1 can be used to conserve power of the battery 186. For the programmable timers 160, the Telematics unit 100 can compare running values to preset values, limits, or thresholds to trigger when to turn on/off the cellular transceiver 134 or the satellite receiver 144 or to perform some other action to conserve the battery 186. For example, the Search Duration Timer discussed previously can be used to track how much time has elapsed since the last time the cellular transceiver 134 or the satellite receiver 144 was in coverage. The Search Duration Timer can be compared to a number of preset values or limits to determine if the Telematics unit 100 should continue or stop searching for coverage. For example, the Search Duration Timer can be compared to a preset Tsearch value that represents the maximum allotted time to search in one instance of no cellular service for either or both of the transceiver 134 or the receiver 144. The Tsearch value can indicate that if no signal has been received from either the cellular network 30 or the satellite network 40 for a preset amount of time (e.g., 10 minutes), then the Telematics unit 100 can assume the vehicle has no visibility to either network 30 and 40 and can power down both the transceiver 134 and receiver 144.

Additional preset values can be used in conjunction with programmable timers 160 in FIG. 1 to track and control operation of the Telematics unit 100 to conserve the battery 186. In one example, a Tcellular_search value can represent the maximum total time, measured from the time the ignition 184 is turned off, for the cellular transceiver 134 to be powered in a "No Service" state. Current drain on the battery 186 while the cellular transceiver 134 is searching for service may be very high compared to an idle mode of operation. Accordingly, a running timer 160 can be compared to the Tcellular_search value to limit the total time that the cellular transceiver 134 searches in a "No Service" state so as not to drain the vehicle battery 186.

In another example, a Tcellular_idle value can represent the maximum total time, measured from the time the ignition 184 is turned off, for the cellular transceiver 134 to be powered in the "Idle" state. Current drain in the idle state may be lower than in the search state. However, it is still preferable that a running timer 160 is compared to the Tcellular_idle value to limit the total time the cellular transceiver 134 is powered in the Idle state so as not to drain the vehicle battery 186.

In yet another example, a Tsat_search value can represent the maximum total time, measured from the time the ignition 184 is turned off, for the satellite receiver 144 to be powered without acquiring a satellite signal. Current drain in the search mode of the satellite receiver 114 can be very high. Consequently, a running timer 160 can be compared to the Tsat_search value to limit the total time in the satellite receiver 144 searches so as not to drain the vehicle battery 186.

In a final example, a Tsat_idle value can represent the maximum total time, measured from the time the ignition 184 is turned off, for the satellite receiver 144 to be powered in an idle state to receive satellite communications. Again, a running timer 160 can be compared to the Tsat_idle value to limit the total time the satellite receiver 144 is idle so as not to drain the vehicle battery 186. One skilled in the art will appreciate that these and other values and timers 160 can be used to track and control operation of the Telematics unit 100 to conserve the battery 186.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:
1. A system, comprising:
a cellular transceiver for communicating cellular communications with a source of Telematics service via a cellular network;
a satellite receiver for receiving satellite communications from the source via a satellite network; and
at least one controller communicatively coupled to the cellular transceiver and the satellite receiver and configured to control the cellular transceiver and the satellite receiver to establish communication with the source using either one or both of the cellular network and the satellite network, the at least one controller configured to determine whether to use the cellular transceiver or the satellite receiver to communicate with the source,
wherein if the cellular transceiver is determined to be used, the at least one controller is configured to operate in a cellular mode and is configured to receive a message in a first cellular communication communicated from the source to the cellular transceiver,
wherein if the satellite receiver is determined to be used, the at least one controller is configured to operate in a satellite mode and is configured to receive a message in a first satellite communication communicated from the source to the satellite receiver, and
wherein the at least one controller is further configured to:
configure an acknowledgment that the message received in the first satellite communication has been received in the satellite mode; and
return, in a second cellular communication communicated, when the cellular transceiver is determined to be used, from the cellular transceiver to the source, the acknowledgment that the message has been received in the satellite mode;

wherein the at least one controller is operatively coupled to a battery, and wherein the at least one controller is configured to:

determine if a vehicle is turned off, and programmably control power from the battery to the cellular transceiver when the vehicle is turned off; and wherein to programmably control power from the battery to the cellular transceiver, the at least one controller is configured to:

receive a discontinuous reception parameter from the cellular network with the cellular transceiver; and control supply of power from the battery to the cellular transceiver based on the discontinuous reception parameter.

2. The system of claim 1, wherein to determine whether to use the cellular transceiver or the satellite receiver to communicate with the source, the at least one controller is configured to determine one or more of whether the cellular transceiver is capable of communicating with the cellular network, whether the cellular transceiver is out of communication range of the cellular network, whether the cellular network is congested, whether an expense for using the cellular network exceeds a predetermined amount, and whether using the cellular network is not preferred.

3. The system of claim 1, wherein the message comprises one or more instructions, and wherein the at least one controller is configured to instruct one or more vehicle components to implement the one or more instructions in the message.

4. The system of claim 1, wherein the at least one controller in the cellular mode is further configured to return an acknowledgment of the message in a second cellular communication communicated from the cellular transceiver to the source.

5. A Telematics service method, comprising:
establishing communication of a Telematics unit with a source of Telematics service using either one or both of a cellular network and a satellite network;
determining whether to use the cellular network or the satellite network to communicate between the Telematics unit and the source of Telematics service;
if the cellular network is determined to be used, receiving a message in a first cellular communication communicated from the source to the Telematics unit with the cellular network;
if the satellite network is determined to be used, receiving the message in a first satellite communication communicated from the source to the Telematics unit with the satellite network; and
wherein the act of receiving the message in the first satellite communication communicated from the source to the Telematics unit with the satellite network further comprises:
configuring an acknowledgment that the message received in the first satellite communication has been received in the satellite mode;
returning, in a second cellular communication communicated, when the cellular network is determined to be used, from the Telematics unit to the source, the acknowledgment that the message has been received in the satellite mode;
determining if a vehicle is turned off;
programmably controlling power to the cellular transceiver when the vehicle is turned off;

wherein the act of programmably controlling power to the cellular transceiver comprises:
receiving a discontinuous reception parameter from the cellular network; and
controlling supply of power to the cellular transceiver based on the discontinuous reception parameter.

6. The method of claim 5, the act of determining whether to use the cellular network or the satellite network to communicate between the Telematics unit and the source of Telematics service comprises determining one or more of:
whether the cellular transceiver is capable of communicating with the cellular network,
whether the cellular transceiver is out of communication range of the cellular network,
whether the cellular network is congested,
whether an expense for using the cellular network exceeds a predetermined amount, and
whether using the cellular network is not preferred.

7. The method of claim 5, wherein the message comprises one or more instructions, and wherein the method further comprises instructing one or more vehicle components to implement the one or more instructions in the message.

8. The method of claim 5, wherein the act of receiving the message to the first cellular communication communicated from the source to the Telematics unit with the cellular network further comprises returning an acknowledgment of the message in a second cellular communication communicated from the Telematics unit to the source with the cellular network.

9. The system of claim 1, wherein the at least one controller is further configured to configure the acknowledgment that the message has been received in the satellite mode to indicate that an instruction in the message has been successfully performed.

10. The method of claim 5, further comprising: configuring the acknowledgment that the message has been received in the satellite mode to indicate that an instruction in the message has been successfully performed.

11. A system, comprising:
a cellular transceiver for communicating cellular communications with a source of Telematics service via a cellular network;
a satellite receiver for receiving satellite communications from the source via a satellite network; and
at least one controller communicatively coupled to the cellular transceiver and the satellite receiver and configured to control the cellular transceiver and the satellite receiver to establish communication with the source using either one or both of the cellular network and the satellite network, the at least one controller configured to determine whether to use the cellular transceiver or the satellite receiver to communicate with the source,
wherein if the cellular transceiver is determined to be used, the at least one controller is configured to operate in a cellular mode and is configured to receive a message in a first cellular communication communicated from the source to the cellular transceiver,
wherein if the satellite receiver is determined to be used, the at least one controller is configured to operate in a satellite mode and is configured to receive a message in a first satellite communication communicated from the source to the satellite receiver, and
wherein the at least one controller is further configured to:
configure an acknowledgment that the message received in the first satellite communication has been received in the satellite mode; and return, in a second cellular communication communicated, when the cellular transceiver is determined to be used, from the cellular transceiver to the source, the acknowledgment that the message has been received in the satellite mode;

wherein the at least one controller is operatively coupled to a battery, and wherein the at least one controller is configured to:
  determine if a vehicle is turned off, and
  programmably control power from the battery to the satellite receiver when the vehicle is turned off; and
wherein to programmably control power from the battery to the satellite receiver, the at least one controller is configured to:
  obtain on and off times designated for operating the satellite receiver; and
  control supply of power to the satellite receiver based on the designated on and off times.

12. The system of claim 11, wherein to determine whether to use the cellular transceiver or the satellite receiver to communicate with the source, the at least one controller is configured to determine one or more of whether the cellular transceiver is capable of communicating with the cellular network, whether the cellular transceiver is out of communication range of the cellular network, whether the cellular network is congested, whether an expense for using the cellular network exceeds a predetermined amount, and whether using the cellular network is not preferred.

13. The system of claim 11, wherein the message comprises one or more instructions, and wherein the at least one controller is configured to instruct one or more vehicle components to implement the one or more instructions in the message.

14. The system of claim 11, wherein to control supply of power from the battery to the satellite receiver based on the designated on and off times, the at least one controller is configured to:
  program a plurality of timers to track on and off states in which the satellite receiver is operated, and
  compare the timers to the on and off times designated for operating the satellite receiver.

15. The system of claim 11, wherein to programmably control power from the battery to the satellite receiver, the at least one controller is configured to:
  obtain a total allowable duration designated for powering the satellite receiver; and
  control supply of power from the battery to the satellite receiver based on the total allowable duration.

16. The system of claim 11, wherein the at least one controller in the cellular mode is further configured to return an acknowledgment of the message in a second cellular communication communicated from the cellular transceiver to the source.

17. The system of claim 11, wherein the at least one controller is further configured to configure the acknowledgment that the message has been received in the satellite mode to indicate that an instruction in the message has been successfully performed.

18. A Telematics service method, comprising:
  establishing communication of a Telematics unit with a source of Telematics service using either one or both of a cellular network and a satellite network;
  determining whether to use the cellular network or the satellite network to communicate between the Telematics unit and the source of Telematics service;
  if the cellular network is determined to be used, receiving a message in a first cellular communication communicated from the source to the Telematics unit with the cellular network;
  if the satellite network is determined to be used, receiving the message in a first satellite communication communicated from the source to the Telematics unit with the satellite network; and
  wherein the act of receiving the message in the first satellite communication communicated from the source to the Telematics unit with the satellite network further comprises:
    configuring an acknowledgment that the message received in the first satellite communication has been received in the satellite mode;
    returning, in a second cellular communication communicated, when the cellular network is determined to be used, from the Telematics unit to the source, the acknowledgment that the message has been received in the satellite mode;
  determining if a vehicle is turned off;
  programmably controlling power to the satellite receiver when the vehicle is turned off;
  wherein the act of programmably controlling power to the satellite receiver comprises:
    obtaining on and off times designated for operating the satellite receiver; and
    controlling supply of power to the satellite receiver based on the designated on and off times.

19. The method of claim 18, the act of determining whether to use the cellular network or the satellite network to communicate between the Telematics unit and the source of Telematics service comprises determining one or more of:
  whether the cellular transceiver is capable of communicating with the cellular network,
  whether the cellular transceiver is out of communication range of the cellular network,
  whether the cellular network is congested,
  whether an expense for using the cellular network exceeds a predetermined amount, and
  whether using the cellular network is not preferred.

20. The method of claim 18, wherein the message comprises one or more instructions, and wherein the method further comprises instructing one or more vehicle components to implement the one or more instructions in the message.

21. The method of claim 18, wherein the act of controlling supply of power to the satellite receiver based on the designated on and off times comprises:
  programming a plurality of timers to track on and off states in which the satellite receiver is operated, and
  comparing the timers to the on and off times designated for operating the satellite receiver.

22. The method of claim 18, wherein the act of programmably controlling power to the satellite receiver comprises;
  obtaining a total allowable duration designated for powering the satellite receiver; and
  controlling supply of power to the satellite receiver based on the total allowable duration.

23. The method of claim 18, wherein the act of receiving the message to the first cellular communication communicated from the source to the Telematics unit with the cellular network further comprises returning an acknowledgment of the message in a second cellular communication communicated from the Telematics unit to the source with the cellular network.

24. The method of claim 18, further comprising: configuring the acknowledgment that the message has been received in the satellite mode to indicate that an instruction in the message has been successfully performed.

* * * * *